United States Patent [19]

Stark et al.

[11] Patent Number: 6,161,274
[45] Date of Patent: *Dec. 19, 2000

[54] DYNAMOELECTRIC MACHINE AND PROCESSES FOR MAKING THE SAME

[75] Inventors: William H. Stark, Yoder; Muhammad S. Malik, Fort Wayne; Lawrence L. Lee, Fort Wayne; Peter J. Klug, Fort Wayne; Arthur C. Keck, Fort Wayne, all of Ind.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/015,583

[22] Filed: Jan. 29, 1998

Related U.S. Application Data

[62] Division of application No. 08/725,530, Oct. 3, 1996, Pat. No. 5,767,596.

[51] Int. Cl.[7] .......................... H02K 15/00; H02K 15/14; H02K 15/16
[52] U.S. Cl. ................................. 29/596; 29/597; 29/598; 29/602.1; 29/606; 310/40 R; 310/42; 310/49 R; 310/90; 310/158; 310/248
[58] Field of Search .............................. 29/596, 598, 597, 29/602.1, 605, 606, 607; 310/42, 89, 90, 40 R, 258, 158, 248, 49 R

[56] References Cited

U.S. PATENT DOCUMENTS

| | | |
|---|---|---|
| 4,539,745 | 9/1985 | Manson ...................................... 29/596 |
| 4,688,324 | 8/1987 | Morrill ....................................... 29/596 |
| 4,806,811 | 2/1989 | Mayumi et al. .......................... 310/89 |
| 4,829,208 | 5/1989 | Uchino ..................................... 310/268 |
| 4,853,572 | 8/1989 | Morrill ..................................... 310/90 |
| 4,862,581 | 9/1989 | Royer ....................................... 29/596 |
| 4,949,000 | 8/1990 | Petersen .................................. 310/179 |
| 5,256,926 | 10/1993 | Hegenlocher et al. .................. 310/259 |
| 5,430,931 | 7/1995 | Fisher et al. .............................. 29/596 |
| 5,758,404 | 6/1998 | Baumann et al. ........................ 29/598 |

*Primary Examiner*—Valencia Martin-Wallace
*Assistant Examiner*—Binh-An Nguyen
*Attorney, Agent, or Firm*—Welsh, Katz, Ltd.; Carl B. Horton; Damian G. Wasserbauer

[57] ABSTRACT

Disclosed are methods of making dynamoelectric machines which include use of two sheet metal cup-shaped members to form a housing that completely surrounds and encloses the stator. The stator is assembled with a can in such a manner that the core of the stator is completely contained within the can. Thereafter, a cap is positioned at the exposed face of the stator and the cap and can are joined together by a sheet metal fastening technique which displaces material from one superposed sheet into a second sheet of material. The can and cap are precision formed so that they will have precision sized and located bearing receivers and core retention regions. Both the cap and the can are provided with multiple flange locations which are utilized for fastening the can and cap together during the assembly process. The cap is also provided with a notch which accommodates a lead protecting grommet that preferably is held in place by one or more bosses or pins that are fastened in openings in still another flange formed on the can.

5 Claims, 7 Drawing Sheets

FIG_5

FIG_6

FIG_7

FIG_8

FIG_9

FIG_10

FIG_11

FIG_12

DYNAMOELECTRIC MACHINE AND PROCESSES FOR MAKING THE SAME

This application is a divisional application of U.S. patent application Ser. No. 08/725,530, now U.S. Pat. No. 5,767, 596, issued on Jun. 16, 1998, entitled DYNAMOELECTRIC MACHINE AND PROCESS FOR MAKING SAME, filed Oct. 3, 1996.

The present invention relates generally to new and improved dynamoelectric machines, such as electric motors, processes of manufacturing parts for such machines, and processes for assembling such machines.

Dynamoelectric machines, such as electric motors and generators, typically include a stator, a shaft mounted rotor, and a housing or frame parts that hold the stator in a desired place or position and that also locate and hold one or more bearings axially centered within the bore of the stator. The one or more bearings in turn receive the shaft and thus support the rotor in the stator bore. Other parts are also included of course, such as lead wires, lead wire bushings, mounting brackets, mounting feet or studs, and so forth.

Traditionally, high quality motors having a size of about two and one half inches in diameter or larger would be ones that were characterized as being quiet in operation, having satisfactorily long life, and capable of being manufactured by processes that have a good yield. For example, high quality fan motors made by the assignee of this application, having an outer diameter of about 12.4 cm (about 4.875 inches) have long been made by using a housing, two separate end frames or end shields, bearings and lubricating material carried in the end shields, and the requisite rotor and stator assemblies. One particular model of this type of motor has included forty-five different pieces or parts and was put together by performing a multitude of different process steps.

Some manufacturers have made motors of this same general size utilizing a smaller number of parts and, apparently, a reduced number of steps. Such other motors sometimes are referred to as "clam shell" motors. Motors of this type known to us involve the use of two cup-like housing members that are pressed onto the stator core of a motor from opposite axial ends of the stator. The cup-shape members may or may not meet one another (that is they may or may not completely cover the outer periphery of the stator core).

While clam shell type motors as described above are believed to have significant quality and performance shortcomings, they do nonetheless represent a design approach which, if implemented satisfactorily from a quality standpoint, could represent a significant cost savings as compared to more conventional approaches. Accordingly, it would be desirable to provide new and improved methods of assembling motors that include the use of two generally cup-shaped members that both surround and contain a stator and confine a rotor in a central concentric location with respect to the bore of the stator by consistently and accurately establishing aligned, concentric, relative locations of one or more bearings and the bore of the stator.

It would be also desirable to provide a new and improved motor construction and arrangement of motor parts which could take advantage of the relative simplicity of using two cup-shaped housings for the motor and yet still yield quiet, long lived motors. It would also be desirable to provide new and improved motor constructions, and methods of assembling the parts utilized in such construction, which avoid the use of adhesive materials and yet which rigidly secure various motor parts together while avoiding the application of deforming stresses to the motor parts (e.g., those associated with welding heat induced distortions and stresses, and various mechanical stresses).

Accordingly, it is a general object of the present invention to provide new and improved methods of making motor assemblies whereby the above mentioned and other problems may be solved.

It is a more particular object of the present invention to provide new and improved methods of assembling motors that result in a high quality product utilizing relatively few number of parts and relatively inexpensive assembly techniques.

It is still a further object of the present invention to provide new and improved electric motors that have the desired features mentioned above and which may be advantageously manufactured utilizing the new and improved methods disclosed herein.

SUMMARY OF THE INVENTION

In carrying out the above and other objects of the invention, in one preferred form thereof, we provide methods of making new and improved dynamoelectric machines which include the use of two cup-shaped members to form a housing that may be utilized to completely surround and enclose the stator of the motor. In what is believed to be a significant departure from the prior art teachings, we assemble the stator of the motor with one of the cup-shaped members (hereinafter referred to as a "can") in such a manner that the core of the stator is completely contained within the can. Thereafter, a second cup-shaped housing member (hereinafter referred to as a "cap") is positioned at the exposed face of the stator and the cap and can are joined together by a fastening technique which avoids or at least minimizes the creation of unbalanced stresses in the cap and can and thus minimizes forces that would tend to cause misalignment of bearings that are carried respectively by the cap and can.

In a preferred form described herein, we precisely form the can and cap so that they will have precision sized and located bearing receivers that may be bearing retaining pockets (as illustrated herein). We also provide a precision stator mounting area around an inner peripheral surface or band of the can. In preferred constructions illustrated herein, we then locate a bearing in the bearing pocket of the can, and press the stator assembly of the motor into the can so that the ferromagnetic core of the stator (which has spaced apart end faces) is completely contained within the confines of the can.

The can has a generally cylindrical wall, a first end that carries the bearing receiver and that generally defines a first plane, and an open end that generally defines a second plane generally parallel to the first plane. Neither end face of the core is located outside of the space defined by the generally cylindrical wall and the first and second planes. Subsequently, we apply a light grease to the bearing pockets of both cup-shaped members, install a wavy washer (if one is to be used) in one of the bearing pockets, dress motor leads at a desired exit location from the can, position the rotor body (with bearings preinstalled on shaft ends) in the bore of the stator and thus the can, and thereafter place the cap over the stator and rotor and seat a shaft bearing in a bearing pocket in the cap. We hold abutting flanges carried by the cap and can in superposed position, and fasten abutting or opposing flanges together by a technique that does not induce the above mentioned distorting stresses into the cup-shaped members. We have determined that the best mode known to us for accomplishing this assembly process is a process that is known in the fastening industry as the "TOG-L-LOC®" process, practiced by using tools purchased from the owner of the trademark. This and similar processes involve a metal displacement process whereby a button of material of one flange is forced or pressed into the other flange. Thus, the preferred process involves displacing material from one of a pair of abutting flanges into a space formed in the other of the pair of flanges during the fastening step.

Preferred physical embodiments of our invention disclosed herein include a stator and rotor confined within an enclosure or housing and formed from a can and cap, two generally cylindrical walled members that each have an open end and a second end that defines a bearing receiver. Such second end will be referred to as a "closed" end, although it may in fact have openings therein for ventilation, termination connection, etc. The can is manufactured and dimensioned in two key regions to have extremely good dimensional accuracy, repeatability, and precision. The cap is manufactured so as to have one dimensionally precise region. Both the cap and the can are provided with multiple flange locations which are utilized for fastening the can and cap together during the assembly process. In our preferred embodiment, the cap is also provided with a notch which accommodates a lead protecting grommet that preferably is held in place by one or more bosses or pins that are in openings in still another flange formed on the can.

The subject matter which we regard as our invention is set forth in the appended claims. The invention itself, however, together with further objects and advantages thereof may be better understood by referring to the following more detailed description taken in conjunction with the drawings.

DESCRIPTION OF THE PREFERRED EMBODIMENTS

In FIGS. 1–4 we have illustrated an electric motor that embodies our invention in a preferred form and that was assembled by utilizing our preferred processes.

Figure 4:
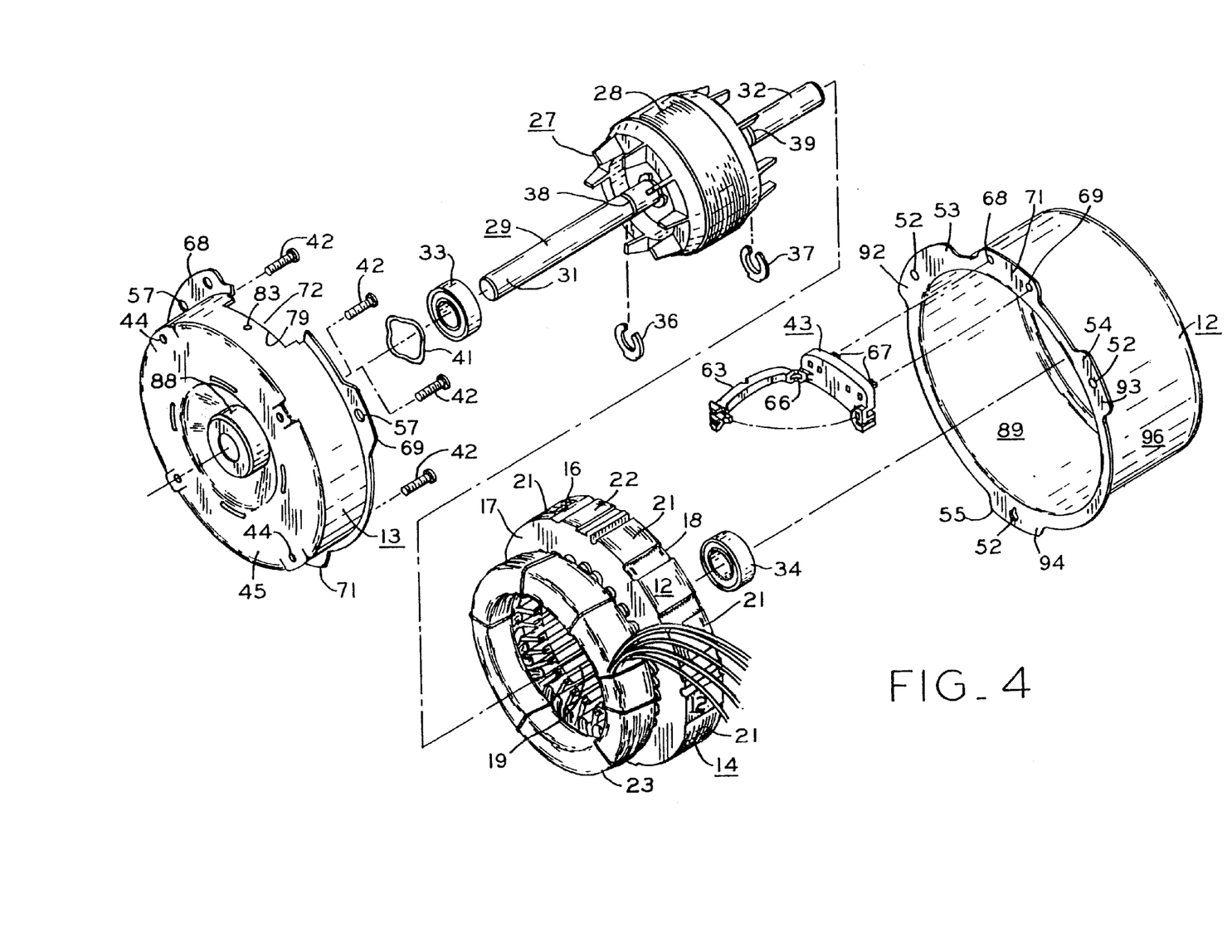
FIG. 4 is an exploded perspective view of the parts utilized in the motor of FIG. 1, showing such parts in the condition thereof prior to being assembled together.
Figure 5:
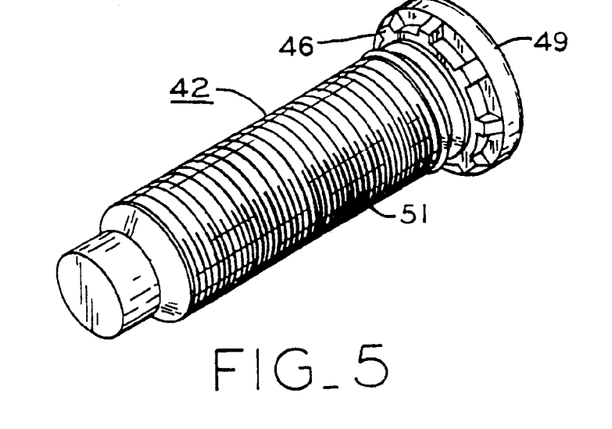
FIGS. 5 and 6, respectively, are perspective and elevation views of a mounting stud, four of which are utilized with the motor in FIG. 1.
Figure 6:
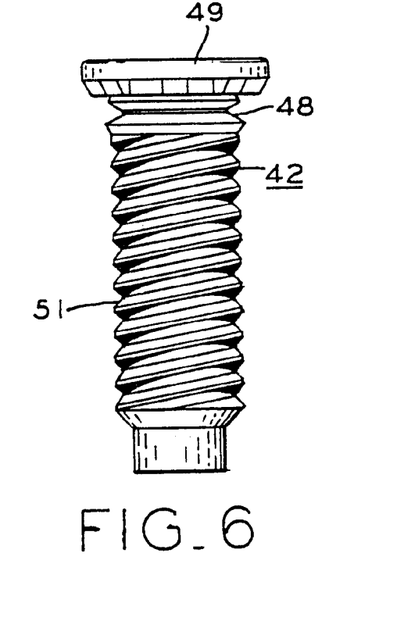

With particular reference to FIG. 4, it will be seen that the housing (generally denoted at 11 in FIG. 1) of the motor 10 is comprised of a first part in the form of can 12 and a second part in the form of cap 13. The motor further includes a stator assembly 14 formed of a ferromagnetic core 16 that has oppositely facing end faces 17, 18 and a centrally disposed bore 19.

The core 16 includes a number of peripheral surface locations 21 that are arcuate in configuration, and six peripheral surfaces 22 that are flat. The core 16 is made of ferromagnetic (e.g., iron or steel) laminations as is well known in the art.

Stator assembly 14 also includes conventional slot and core insulation, windings that include winding end turns or bundles 23, 24, and winding leads or lead wires 26. The illustrated stator assembly 14 may be essentially any desired prior art assembly, and may have a completely round outer periphery, only spaced apart arcuate sections as shown, or as would be the case if the laminations were essentially square with rounded corners.

Figure 1:
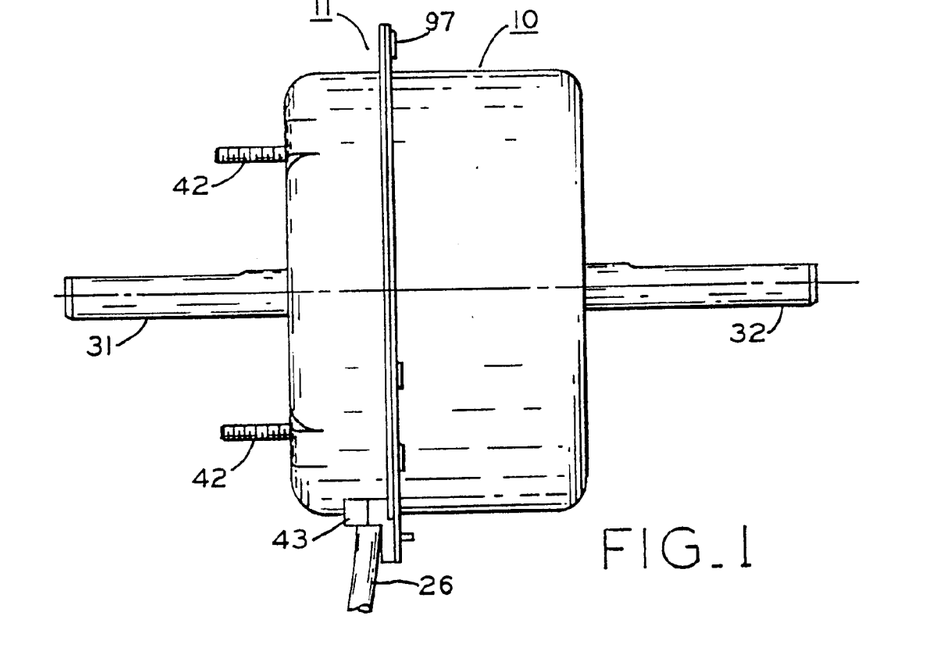
FIG. 1 is a side elevation of a motor embodying the present invention in a preferred form thereof, and which has been made by practicing features of our invention.
Figure 2:
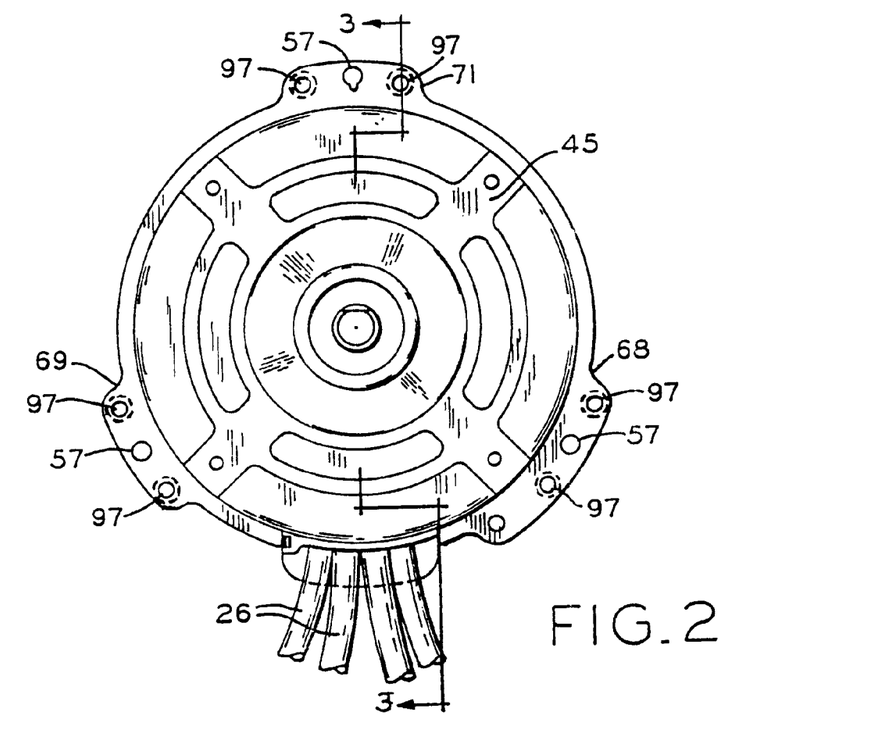
FIG. 2 is a left-hand front elevation of the motor of FIG. 1 as viewed in FIG. 1.

The rotor assembly 27 includes a body shown as a squirrel cage rotor body 28 fastened to a shaft 29 having two shaft extensions 31, 32 which project from opposite sides or ends of the motor (see FIG. 1). While a double shaft extension motor is illustrated herein, it is emphasized that the inventions disclosed herein may be used with equal facility with single shaft extension motors or generators.

Figure 3:
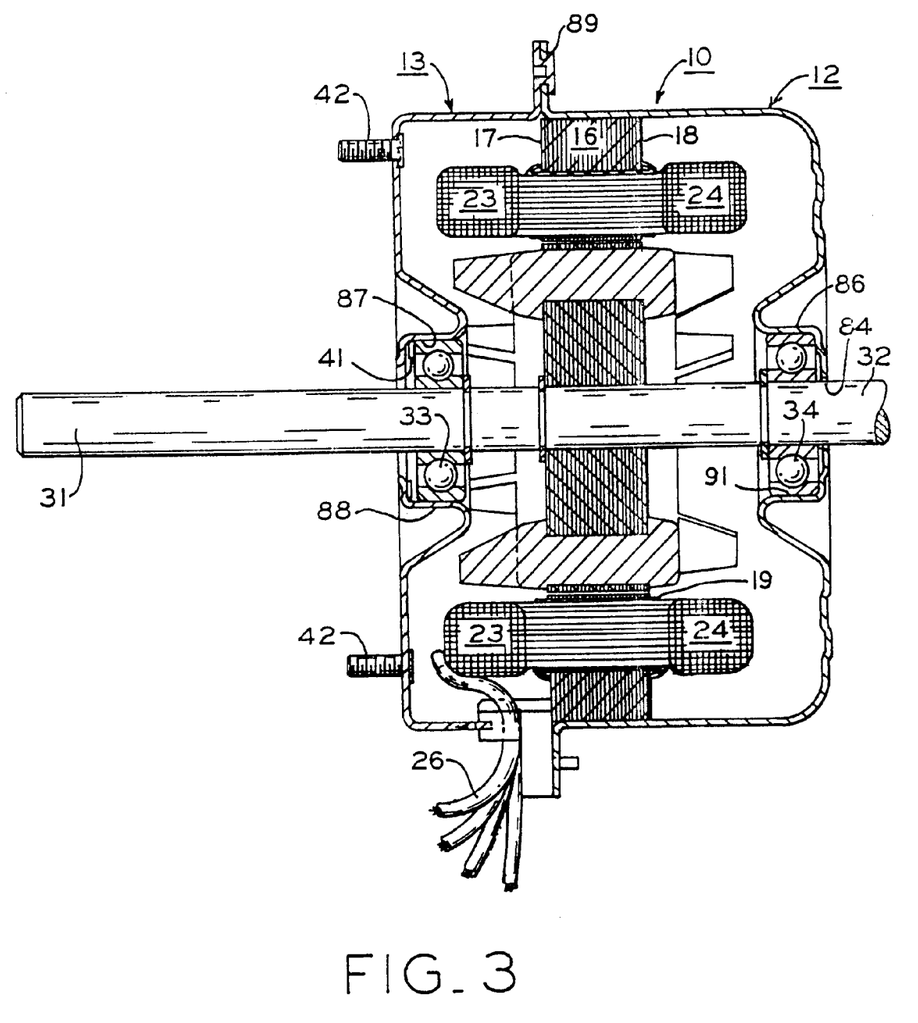
FIG. 3 is a cross-sectional view, with parts in full, parts in section, and parts broken away, taken along the lines 3—3 in FIG. 2.

With particular reference to FIGS. 3 and 4, the rotor assembly 27 further includes two ball bearings 33, 34 that are pressed in place on the shaft. Snap rings 36, 37 snap into grooves 38, 39 in the shaft and are used to define the axial location of the bearings 33, 34. The rotor assembly 27 and wavy or spring washer 41 may be any type conventionally used in motors and thus further construction details are not presented herein. It is noted, however, that the inventive processes described herein and products embodying our invention may be products of types other than AC induction motors. Thus, it will be readily apparent to those of skill in the art that our inventive concepts may be applied to DC motors (of the brush or brushless type), universal motors, generators, and alternators.

Figure 7:
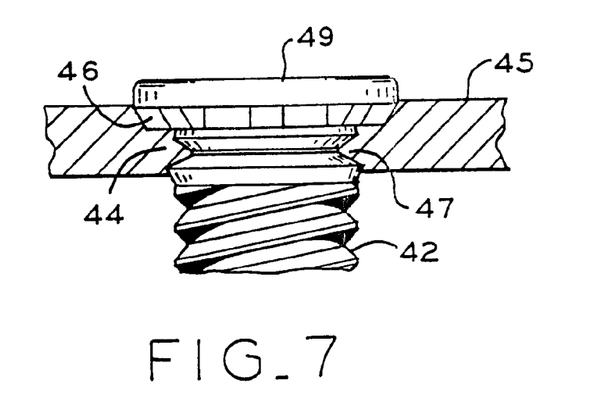
FIG. 7 is an enlarged cross-sectional view, with parts broken away, of a mounting stud and the part of the cap member that holds such stud.

With continued reference to FIGS. 3 and 4, attention is now directed to can 12, cap 13, mounting studs 42, and lead grommet 43. Studs 42 are made of hardened steel and preferably are anchored in holes 44 in cap 13 by being pressed therein as suggested by FIG. 7. When this process is followed, material 47 in the cap that surrounds the holes 44 in the wall 45 of cap 13 is believed to tend to interlock with a circumferential groove 48 formed near the head 49. During the pressing operation that assembles the studs to the cap, serrations 46 bite into the cap wall 45 and provide resistance to rotation of the studs about their longitudinal axis when motor mounting fasteners are threaded onto the stud threads 51.

It will be understood by persons skilled in the art that means other than studs 42 may be used for mounting motor 10 in a particular application. For example, so-called bellyband mounting techniques may be used. Alternatively and advantageously, holes 52 in the three flanges 53, 54, 55 of can 12, and holes 57 in the three flanges 68, 69, 71 of the cap 13 may be used (after assembly and securement of the cap to the can) to accommodate fasteners which fasten the motor 10 to a mounting structure such as, for example, a bulkhead in a room air conditioner or a separate bulkhead mount type of mounting bracket having a hole through which part of the motor 10 protrudes.

With particular reference now to FIGS. 8–11 and FIGS. 3 and 4, details of the lead grommet 43 and its relationship to cap 13, can 12, and lead wires 26 will be described. The grommet 43 (see FIGS. 8 and 4) is comprised of a mounting base portion 62, lead retaining portion 63 which has a closure hook 64, and an integral hinge 66 that joins portions 62 and 63 and permits pivotal movement so that the two portions can be closed, with hook 64 inserted, in latching engagement into hole 66 (see FIG. 9) in the base portion and thus configure the grommet in a "closed and latched" condition or state.

Figure 8:
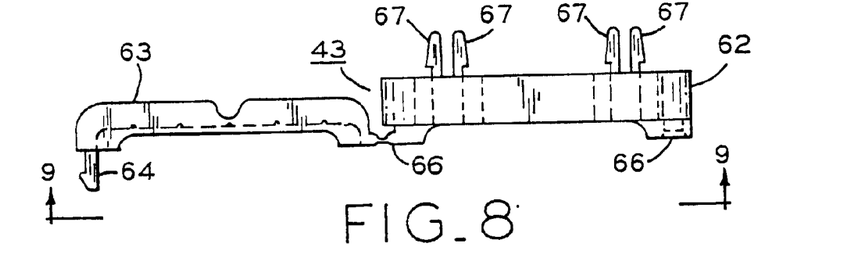
FIG. 8 is an elevation of a lead protecting grommet used in the motor of FIG. 1.
Figure 9:
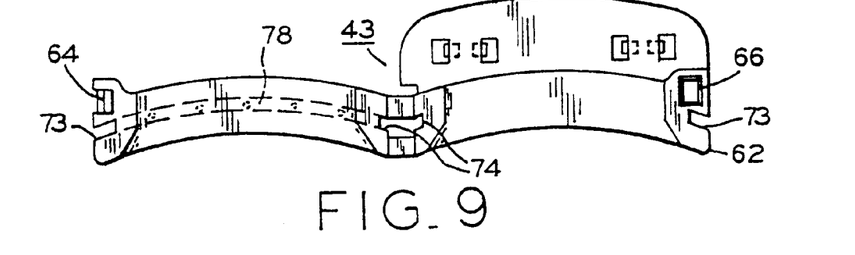
FIG. 9 is a view taken in the direction of the lines 9—9 in FIG. 8.
Figure 10:
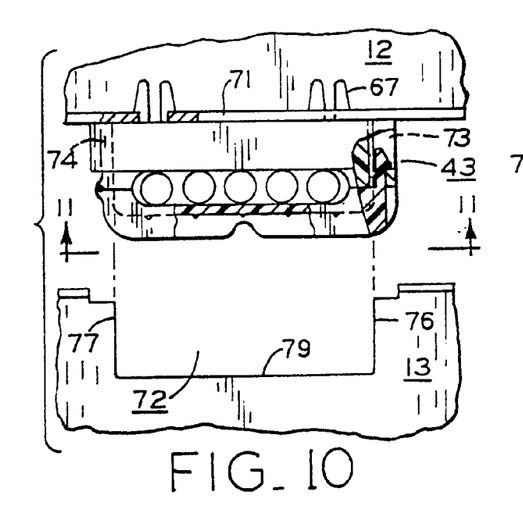
FIG. 10 is a view showing the relationship of the grommet of FIG. 9 relative to sections of the cap and can that confine the grommet in place after assembly.
Figure 11:
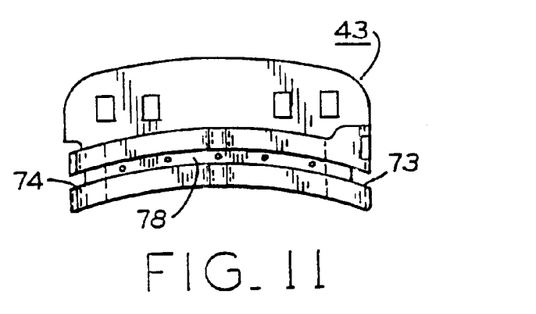
FIG. 11 is a view, with parts removed, taken along the lines 11—11 on FIG. 10.

With particular reference to FIGS. 8, 4, and 10, the base portion 62 includes latch members 67 which are used to latch or lock the grommet 43 into holes 68, 69 in the flange 71 formed on can 12. During the assembly processes described hereinbelow, a grommet 43 is locked into place on a flange 71, leads 61 are manually positioned and held in the relative position depicted by FIG. 10, and the retainer or retaining portion 63 is moved to its closed position and latched in place as shown in FIG. 10. Thereafter, during one assembly process, cap 13 is assembled with and fastened to can 12, and cut-out 72 accommodates grommet 43. To facilitate such accommodation, grommet 43 is provided with side grooves or notches 73, 74 that accept and fit with side edges 76, 77 of the cap along the cut-out 72. The grommet 43 is also provided with a curved notch or groove 78 that interfits with and accepts the curved edge 79 (see FIGS. 10 and 4) of the cut-out 72 in the cap 13.

Figure 12:
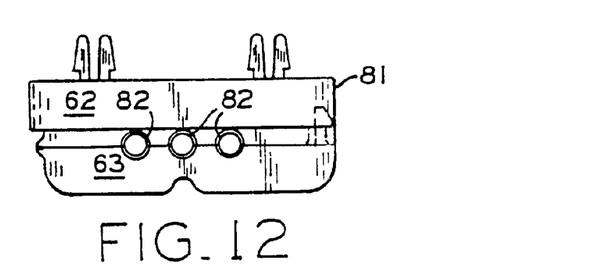
FIG. 12 is a view of a modified grommet that may be used instead of the grommet illustrated in FIGS. 8–11.

FIG. 12 illustrates a grommet 81 that is slightly modified as compared to grommet 43. It will be noted that grommet 81 has all of the same component parts as grommet 43 and, in addition, includes extra material in the facing portions of base 62 and cover 63 so that round openings 82 are defined therebetween. These can be used to relatively tightly trap and retain individual lead wires. When the grommet 81 is used, it may be desirable to also provide a moisture drain hole in the motor 10 such as a hole indicated at 83 on cap 13 in FIG. 4. With regard to drainage, it is noted that the large lead accommodating opening provided by grommet 43 may be also useful for such purpose and drain holes in the motor housing may be omitted. In preferred embodiments of the invention, the grommets are molded from a suitable material such as polypropylene.

Figure 14:
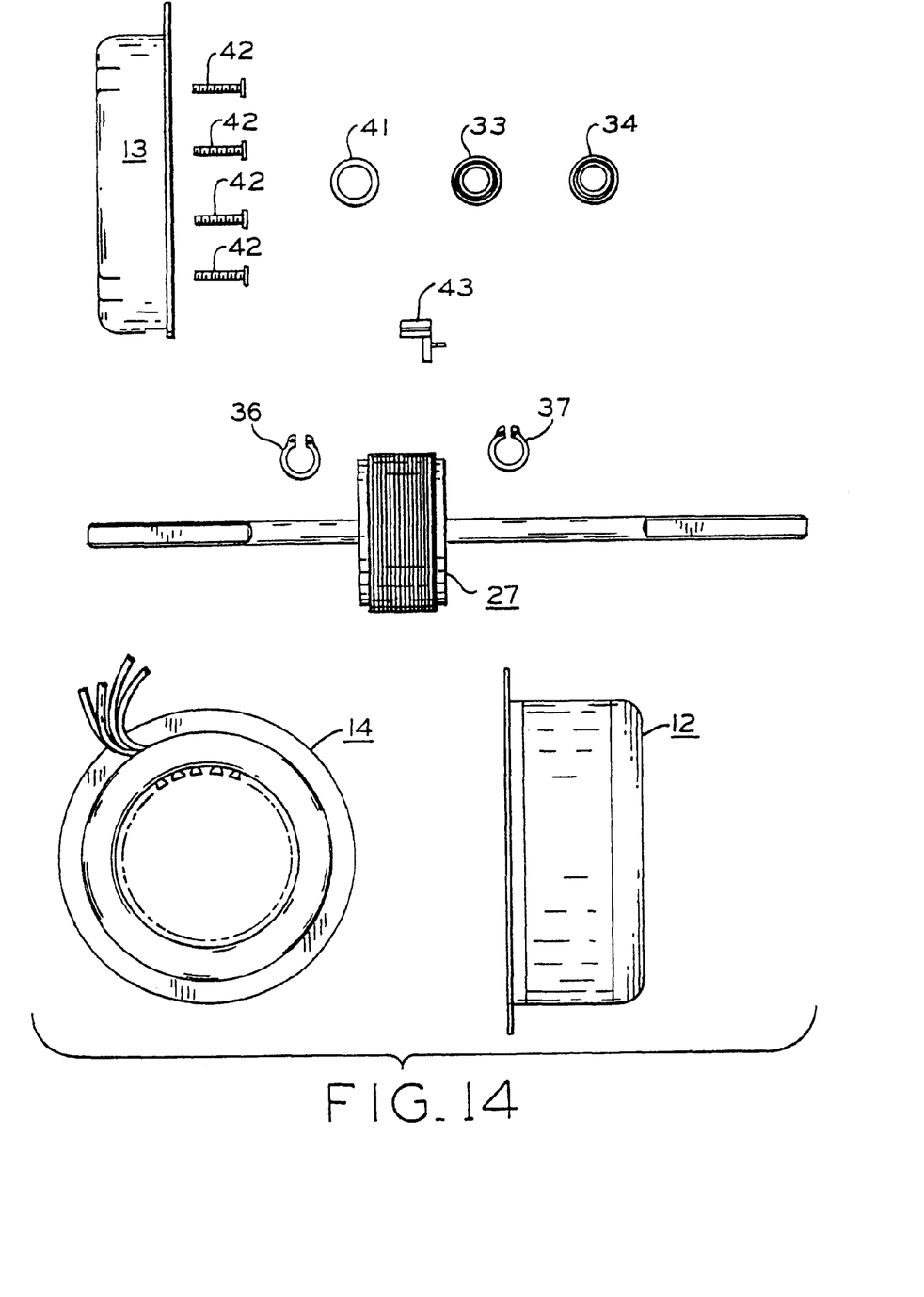
FIG. 14 is a view showing all of the parts utilized in the manufacture of the motor illustrated in FIG. 1.

With reference now to FIGS. 14, 4, and 3, preferred assembly processes and techniques, and further novel structural characteristics and features will be described. Comparison of FIGS. 3, 4, and 14 reveal that the motor 10 is an assembly of the 14 different components or sub-assemblies shown in FIG. 14. Our innovative processes, however, do not include the conventional previously described assembly of the six rotor parts (rotor body, shaft, snap rings, and bearings). Thus, our preferred process includes the steps of: mounting the stator assembly 14 in the can 12 in a repeatable, precise, and predetermined manner; positioning the rotor assembly with the shaft end 32 extending along a bearing receiver such as the opening 84 in the bearing pocket 86, with bearing 34 seated in the interior or cavity of pocket 86, and with the shaft extension 32 nested in a precision bushing and thus held in a precise, predetermined axial alignment. Initially, the can is loosely centered in a fixture with three pins that fit in holes 52 of the flanges on the can. The bearing 34 has a close tolerance (e.g., a clearance of about 0.005 mm to 0.03 mm) fit with the bearing pocket and the can and stator (i.e., "canned stator") move or yield to a position to conform to the location or position of the bearing 34.

Thereafter, we move centering fingers or tools into engagement with the can at three spaced apart locations that correspond to the location of three arcuate locations 21 of the stator core and ensure "centering" of the flanged part of the can with the shaft end 32 and bearing 34. The loose fit between the aforementioned pins and holes 52 permit the necessary amount of movement.

In the next sequence of steps, we position the cap 13 on the bearing 33 with the bearing 33 accommodated in the bearing pocket 87. During this sequence or earlier, the wavy washer is positioned so that it will be retained between the bearing 33 and an interior end wall of the bearing pocket 87 as shown in FIG. 3. In the case of motor 10, the shaft extension 31 protrudes out of the opening in the cap 13 at this step in the process. However, our process may also be used to assemble single shaft extension motors, and thus the presence of shaft extension 31 is not material to our preferred process. As the cap is moved to its loosely assembled position on the bearing 33, the previously mentioned three not shown aligning pins fit in the holes 57 in the flanges of the cap, and the flanges 68, 69, 71 of the cap are positioned in facing relation to the flanges 53, 54, and 55 of the can. Final precision centering of all parts next is accomplished by moving one or more fixture surfaces over and axially along the outer diameter 88 of the bearing pocket or retainer 87 (see FIGS. 3 and 4).

The outer diameter or surface 88 of the bearing pocket 87 external hub has a one degree axial taper, and thus as the centering and assembly fixture moves along the hub. the hub is progressively centered until the fixture stops moving. This centering action of the bearing hub of the cap in turn causes the bearing 33 and rotor shaft to conform to the centering action, with the result that the rotor, stator, can, and cap are all centered about a central longitudinally extending axis (along the rotor shaft) in a precision manner. While the above described parts are all held in alignment as above described, the flanges of the cap and can are fastened together in a manner to not disturb the centered alignment of the parts.

In our preferred techniques we fasten the flanges of the cap and can together by a process that has become well known in industry as the "TOG-L-LOC®" process by using tools obtained from the BTM Corporation of Marysville, MI. The BTM Corporation is also believed to be the owner of the trademark "TOG-L-LOC®".

When using this fastening technique, metal in the flanges of the cap and cans is displaced and interlocked somewhat as shown at 89 in FIG. 3. With this technique, "buttons" of metal are deformed from two pieces of metal and interlocked together without actually cutting a hole all of the way through either piece. This type of process appears to be described in a number of U.S. Patents assigned to BTM Corporation, most of which include the inventor E. Sawdon, and all of which are incorporated herein by reference. Some of these patents are: U.S. Pat. Nos. 4,459,735; 5,177,861; 5,208,973; 5,208,974; 5,339,509; and 5,435,049. Another patent which appears to describe perhaps a variation of this general type of fastening process is U.S. Pat. No. 5,517,743.

Successful practice of the process described above seems to depend on establishing, with very good precision, consistently sized surface locations in three key areas of the can and cap. Those three areas are the band within the can where the stator fits, and the bearing receivers of the can and cap. More specifically, when following the process steps described hereinabove, it's important with stamped and formed steel parts, such as the disclosed cap and can, to form the above mentioned three key areas or regions with consistent precision. For this reason, during manufacture of the can, after the bearing pocket for the can is first formed, it is then "re-struck" with tooling to accurately size it. By using re-strikes, the material of the bearing pocket is moved and shaped, so as to be consistently of the dimension of the tooling used in the last strike. This technique is used to accurately size the side wall interior of the bearing pocket in the can, the exterior, tapered side-wall of the bearing pocket in the cap, and the interior band of the can where the stator core is to be pressed. We have found that exceptionally good results are obtained when the maximum total indicated run-out between the stator mounting band and the interior bearing pocket side wall (in the can) is equal to or less than 0.10 mm.

In preferred embodiments of the invention, we utilized 1.22 mm (0.048 in.) thick low carbon steel that was aluminum-Silicon alloy coated and often simply referred to as "aluminized steel" to make the can and cap. When using this type of material, a number of advantages result. One is that the product can be sold without being painted for rust or corrosion prevention purposes, and the resulting motor product has a pleasant "silvery" appearance. Also, however, this material is easily paintable without expensive pre-painting surface preparation or treatment, and thus manufacturers have the option of painting or not painting the exterior of the product. In addition, the aluminized material readily exhibits evidence that our "restriking" or "burnishing" or "sizing" techniques are followed. For example, the interior of the can is relatively bright "silver" in appearance except in the band or area where the restriking has taken place. This band is identified by the numeral 89 in FIG. 4, and it is medium to dark gray in color, and appears to have "striping" marks therealong. Similar types of discoloration and markings also appear on the key bearing pocket surfaces 88 and the interior surface 91 in pocket 86. In addition the outside of the can 12 seems to often show (see band 96 in FIG. 4) the location of band 89 by having a slightly discolored or burnished appearance.

It should be noted that the process described herein is a preferred one, but variations could easily be made. For example, the interior of pocket 87 could be "sized", and the exterior of pocket 86 could be "sized". In that case, however, the rotor would most likely first be positioned in the cap, and the can and stator would then be placed over the rotor, followed by fastening of the flanges.

A number of product characteristics appear to be helpful in the practice of our process. For example, it is noted that three flanges are used on the can and cap. This is helpful for ensuring proper assembly and "squaring" of the stator core and can. In our preferred process, the stator is placed on a locating post to properly locate the center of the stator bore, and the bottom face of the core rests on a true flat surface perpendicular to the post. The center of the post carries a spring loaded, smaller diameter post onto which bearing pocket 86 closely fits, and an upper fixture moves the can down over the stator (i.e., presses the can on the stator) and squares the can relative to the stator by pressing or pushing on the three flanges close to the side walls of the can. As this step is completed, the entire stator core is surrounded by the can, and no peripheral part of the core between its end faces is exposed to manufacturing forces associated with any subsequent assembly process step. This part of our process results in a significant feature of our product. That is, the can and stator core are pressed together until the face of the flanges 53, 54, 55 are bottomed on the same flat surface as the face 17 of the stator. Accordingly, the end face 17 of the stator is essentially co-planar with the faces 92, 93, 94 of the flanges. Stated in other words, the bearing receiver end of the can 12 generally defines a first plane at one end of the cylindrical walls of the can, the front of the can flanges 53 (as viewed in FIG. 4) generally define a second plane at the other end of the cylindrical wall, and neither face of the stator core is located outside of the space defined by the generally cylindrical wall and the first and second planes (e.g., see FIG. 3). At this point, it will be appreciated that the present inventive concepts could also be applied by having the core rest on a raised step or ledge in the supporting fixture so that the can was pressed to a point such that the plane of the face of the core was offset from the plane of the flanges. Since none of the core would project out of the can, the above described conditions would still be met.

Other steps may also be used when following our process, and those will now be pointed in a recapitulation of the process described above. Initially, the can and stator are pressed together as described above. At a grease bench, four to six "dots" of grease are placed on the interior side walls of the bearing pockets of both the can and the cap, and the relatively viscous grease helps retain the spring washer in the bearing pocket of the cap. Any suitable grease may be used for this purpose, such as a grease sold under the trade name Dolium®.

The grommet 43 then is snapped in place on flange 71 of the can, the stator leads are positioned in the grommet, and the grommet is latched in a closed condition. The can and stator is then placed in a fixture, open end up (with three pins loosely locating the holes 52 in the can flanges); the rotor is placed in the can, with a precision bushing centering the shaft extension 32; and the shaft, acting through the previously pressed in place bearing 34, causes the bearing receiver of the can (bearing pocket 86) to be precision centered with respect to the shaft. Three fingers are cammed into placed against band 96 on the can as described above, and the cap is placed over the can, with the bearing 33 seating in the bearing pocket of the cap, and the three previously mentioned alignment pins loosely or roughly aligning the holes 57 in the flanges of the cap. Thereafter, the cap is pressed to a position where the flanges of the cap and can mate, and the fastening process described above is performed at two locations on each flange (see the six fastener "buttons" 97 in FIG. 2).

By following the process as now described it will be appreciated that a motor of "clam-shell" construction can now be produced that is of extraordinarily high quality because of the establishment and maintenance of close alignment and concentricities of key mechanical elements, and without subjecting those elements to post manufacturing or assembly forces and stresses that cause misalignment.

Figure 13:
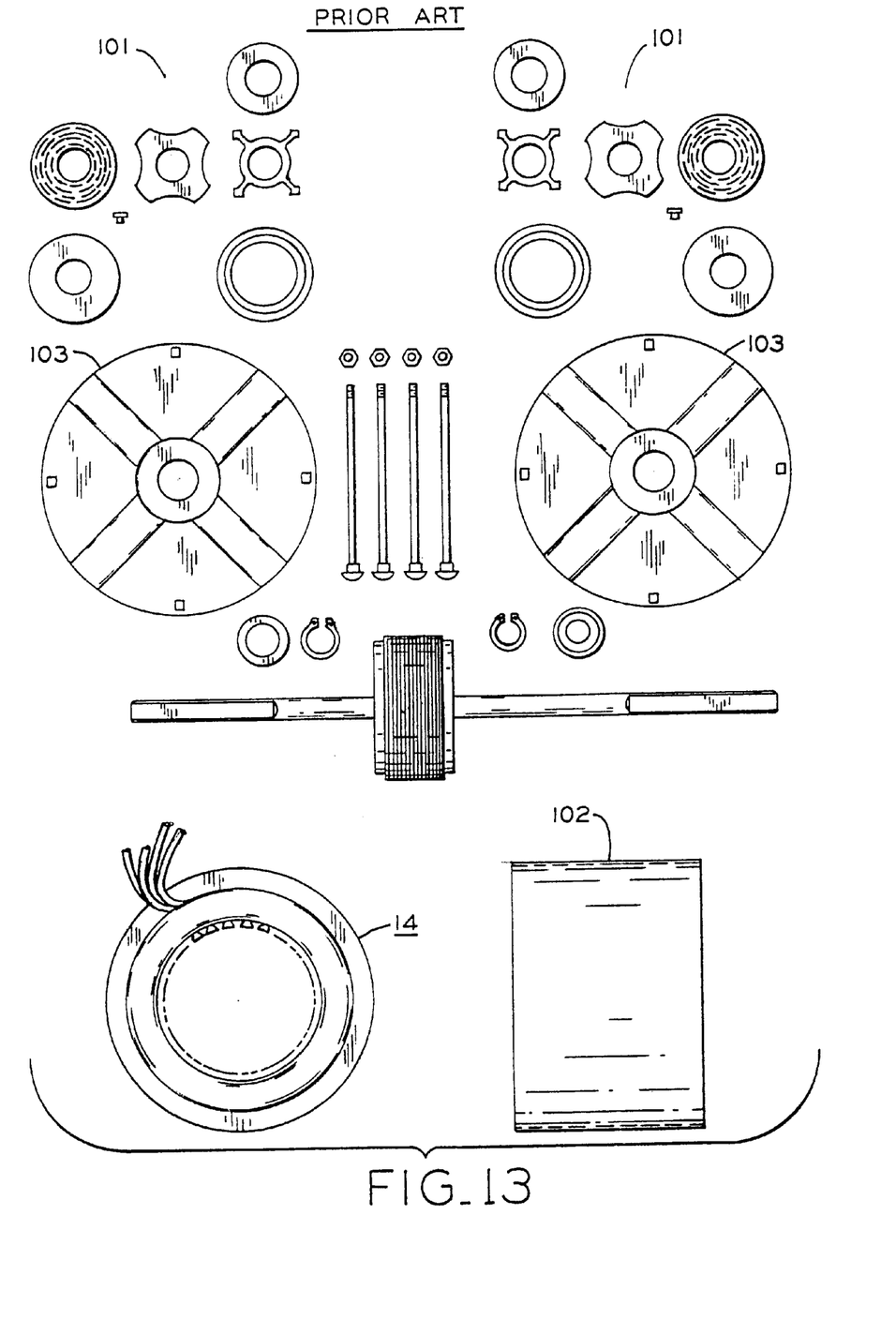
FIG. 13 is a view showing all of the parts utilized in the manufacture of a high-quality prior art motor as manufactured for many years by the assignee of the present application.

The parts used in one prior art motor are shown in FIG. 13. Those parts included a stator assembly 14, a rotor assembly similar to rotor assembly 27 except that sleeve bearings were used rather than ball bearings, various thrust washers, lubrication slingers, lubricant retainers 101, a rolled steel shell 102, two end frames 103 and four through bolts and nuts. Motors made using the parts shown in FIG. 13 are of very high quality, reliable, and quiet in operation. However, a comparison of FIGS. 13 and 14 quickly reveals the great cost advantage (in terms of both cost and assembly labor or time) associated with producing clam shell type motors. This comparison also should emphasize the significance of the process and product innovations presented herein which result in products of such quality, reliability, and performance, that they should be expected to replace motors comprised of the prior parts shown in FIG. 13.

Numerous modifications to our process and product will now become apparent to persons skilled in the art. For example, motors with sleeve bearings on self-aligning bearings (rather than ball bearings) could be produced. In addition, while the closed ends of the illustrated cap and can are shown as solid surfaces, ventilation holes or holes for other purposes could be provided therein.

Accordingly, while we have now shown and described preferred and alternate forms of preferred embodiments of our inventions; the disclosure contained herein should be construed as being exemplary, and each invention itself should be limited only by the scope of the claims that are appended hereto and that form part of our disclosure.

What is claimed is:

1. A method of manufacturing a motor comprising a rotor having a body and a shaft with two ends, a stator having a core and windings with a bore along the core, and a two piece housing comprising a generally cylindrical can having a plurality of radially extending flanges at an open end thereof, and a generally cylindrical cap having a plurality of radially extending flanges at an open end thereof, wherein said cap and can each have a bearing receiver at a second end thereof, the method comprising:

defining a first plane at about a first face of the stator core, and defining a line along a central axis of said stator bore;

positioning said can and core together with the stator bore central axis line perpendicular to the outward faces of the can flanges;

pressing the can and core together until the core is held in place in the can, and the outward face of the flanges on the can are located in generally the same plane as the first face of the stator core or generally in a plane parallel to and spaced outwardly from the plane of the first face of the core;

positioning the rotor body in the bore of the stator core with a first shaft end protruding outwardly through the bearing receiver in the can;

fixing the axial alignment of the first shaft end along a desired axis, and causing the bearing receiver in the can and thus the can to assume a concentric position relative to the first shaft end;

positioning the cap with respect to the rotor so as to accommodate the second shaft end along the bearing receiver in the cap;

precisely centering the cap with respect to the central axis of the shaft;

pressing the cap and can together with the flanges on the cap and can in facing relationship; and thereafter fastening together the flanges of the cap and can while the rotor shaft, stator bore, and bearing receivers are held in a concentric aligned relationship.

2. The method of claim 1 wherein the step of fastening together the flanges includes the step of joining superposed material in abutting flanges by displacing material from one of a pair of abutting flanges into a space formed in the other of the pair of abutting flanges during the fastening step.

3. The method of claim 1 wherein the bearing receivers comprise bearing pockets, ball bearings are pressed onto the shaft, and the method includes placing lubricant in the bearing pockets thereby to inhibit fretting corrosion of the outer races of the ball bearings during operation.

4. A method of assembling a motor comprising a housing can, a housing cap, a stator having a bore therein, and a rotor having a body and a shaft, the method comprising:

defining a line along the central axis of the stator bore, defining a first plane at about a first face of the stator, and resting a first face of the stator on a surface generally perpendicular to said line;

centering a bearing pocket in the can with respect to the bore of the stator and pressing the can completely over the stator with the first face of the core about coplanar with an end of the can while maintaining the centered relationship of the bearing pocket and bore;

precisely centering the shaft of the rotor with respect to the bearing pocket and bore; and fastening the housing cap to the can while confining the stator and rotor body within a housing conjointly defined by the can and cap.

5. The method of claim 4 wherein the method further comprises initially loosely centering the can and cap with one another, and thereafter precisely centering the cap and can and fastening the cap and can together to permanently maintain the precision centered relationship of the cap and can.

* * * * *